S. M. VAUCLAIN, M. LINTON & G. R. HENDERSON.
GEARED LOCOMOTIVE.
APPLICATION FILED FEB. 4, 1913.
1,077,769.
Patented Nov. 4, 1913.
5 SHEETS—SHEET 1.
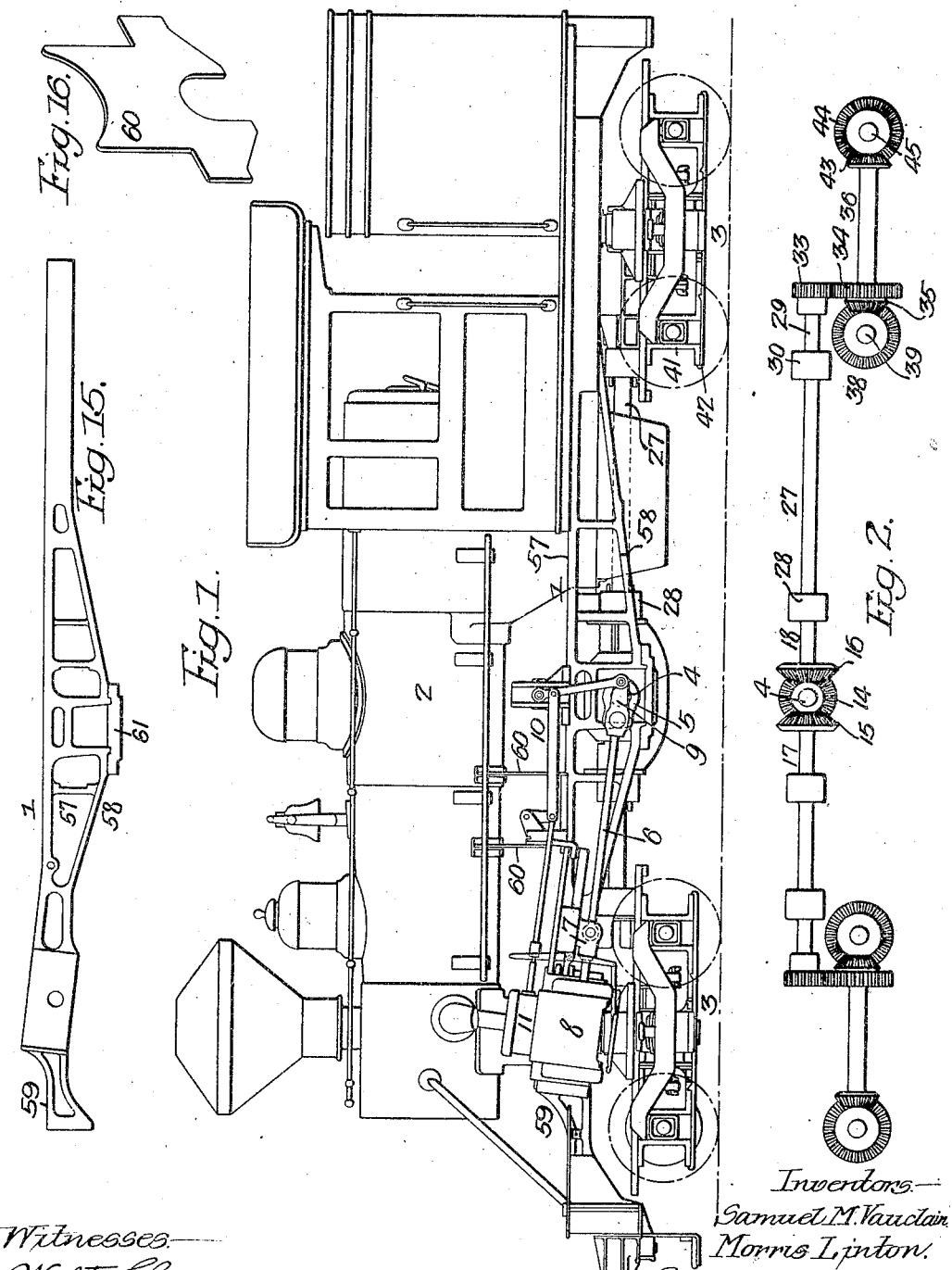

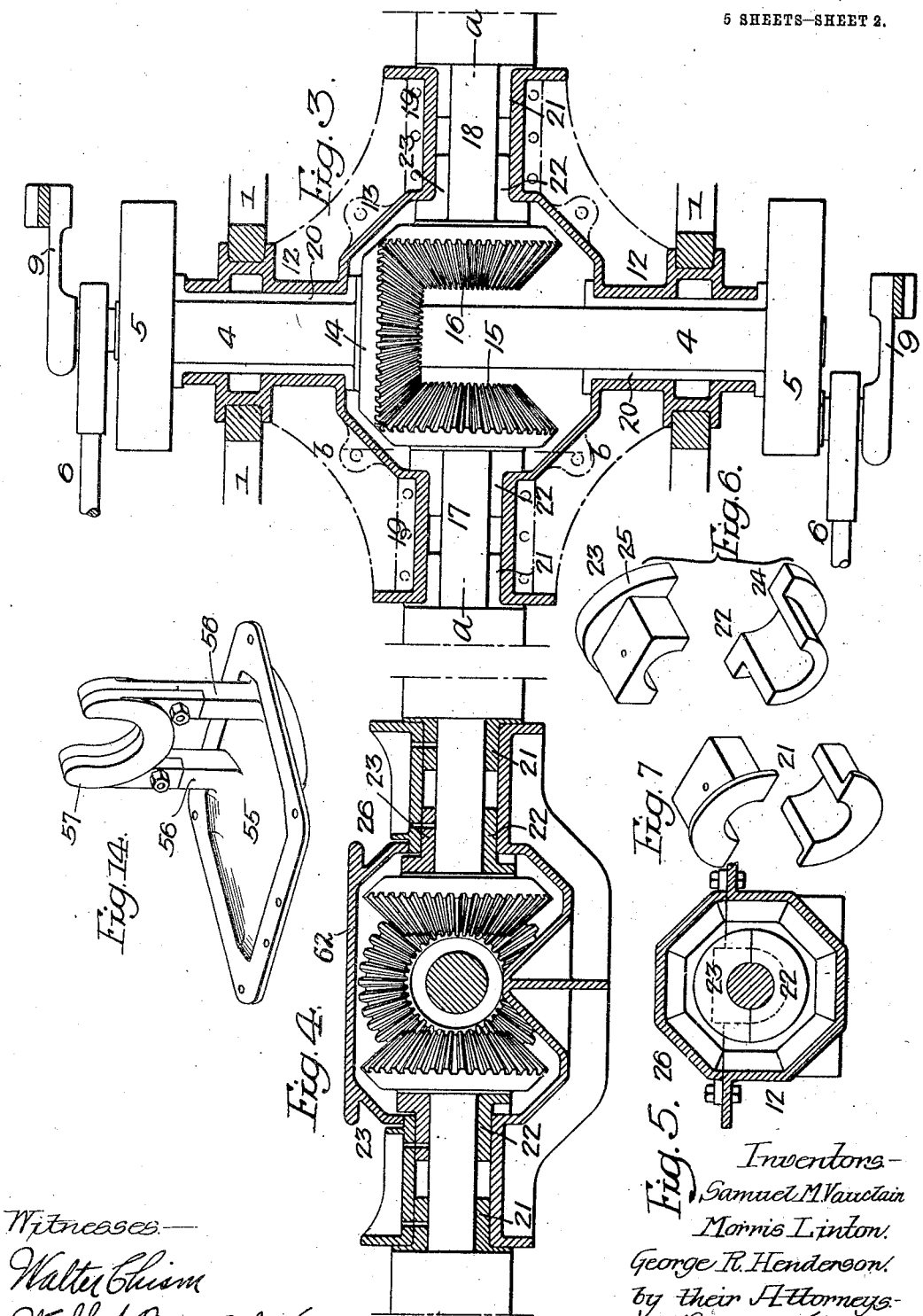

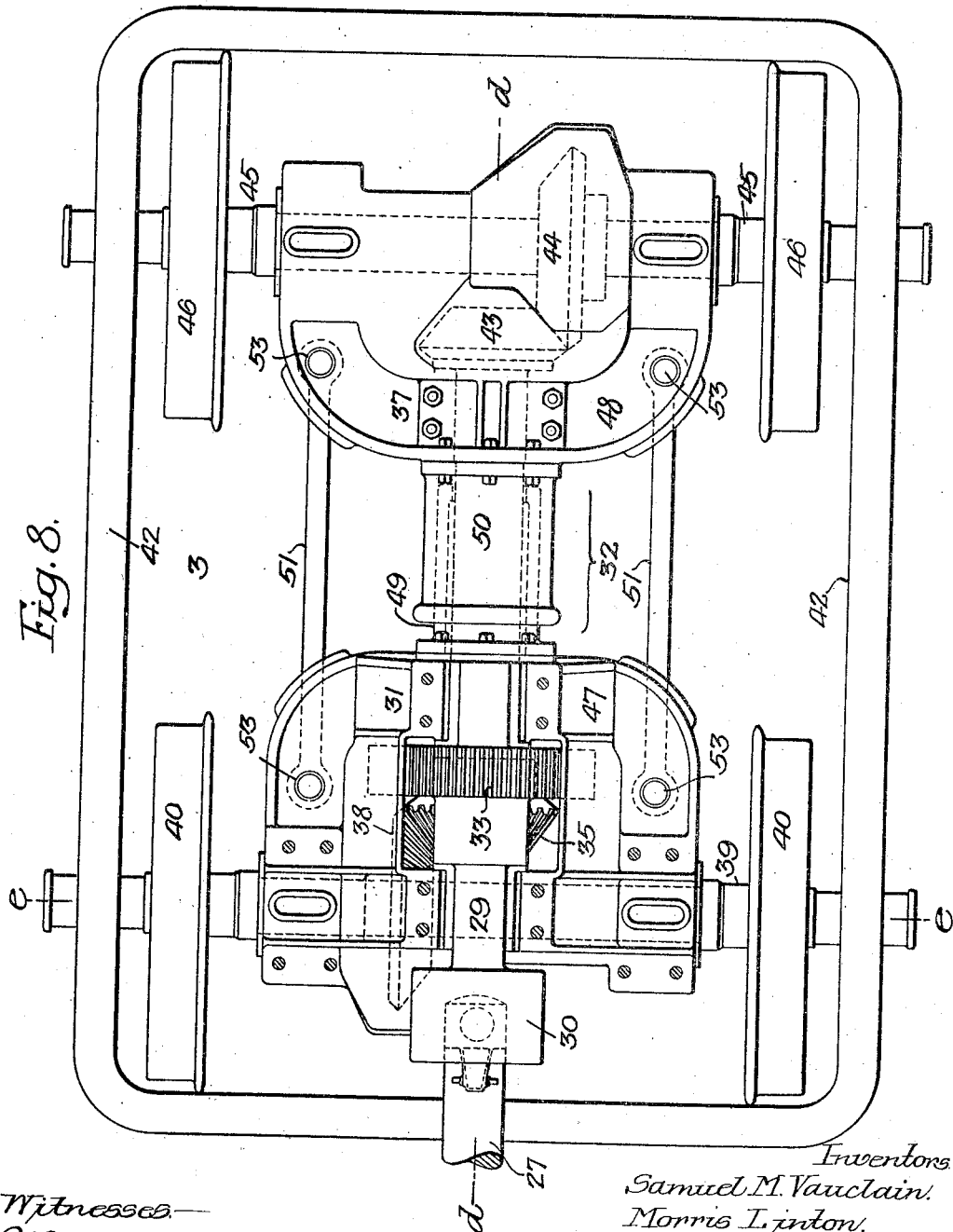

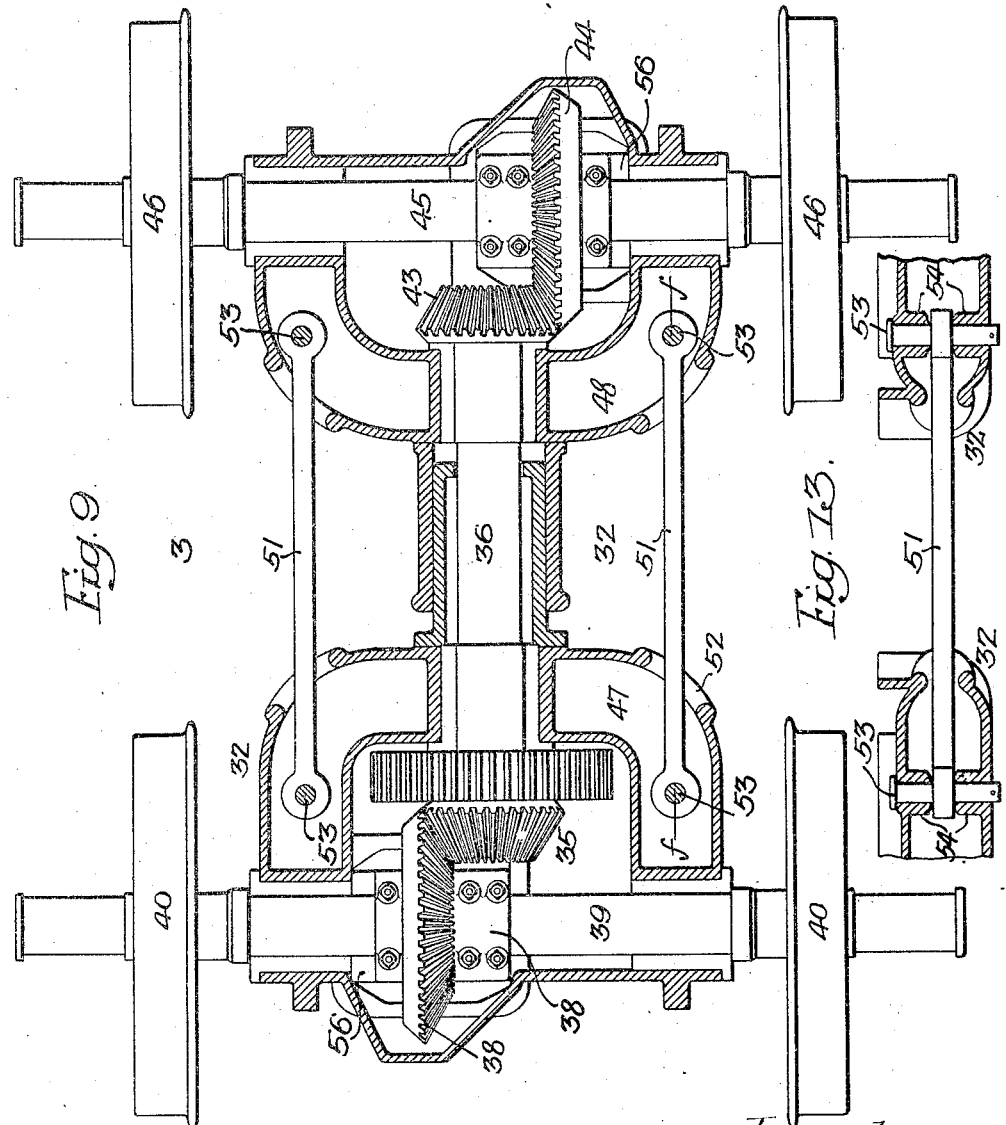

S. M. VAUCLAIN, M. LINTON & G. R. HENDERSON.
GEARED LOCOMOTIVE.
APPLICATION FILED FEB. 4, 1913.
1,077,769.
Patented Nov. 4, 1913.
5 SHEETS—SHEET 5.
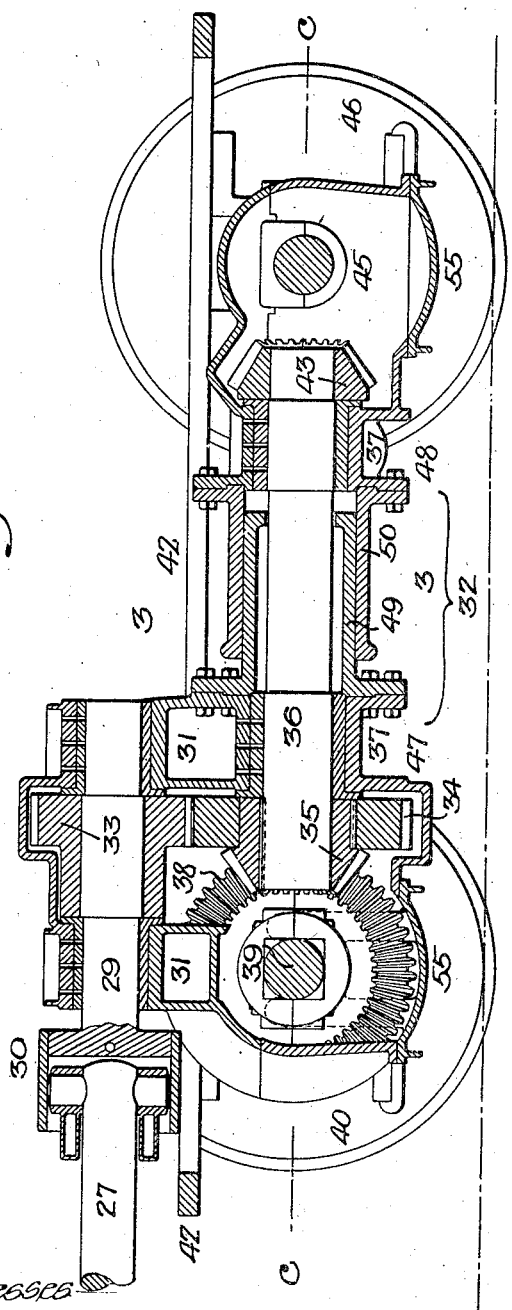
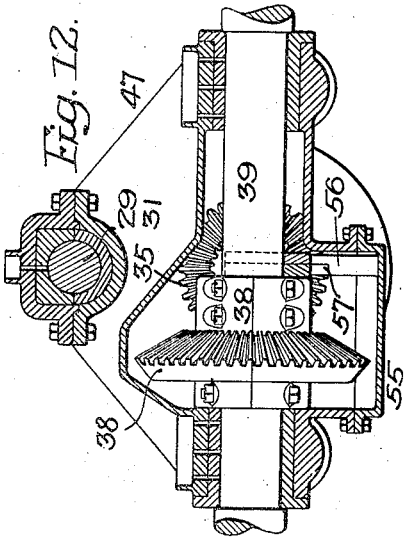
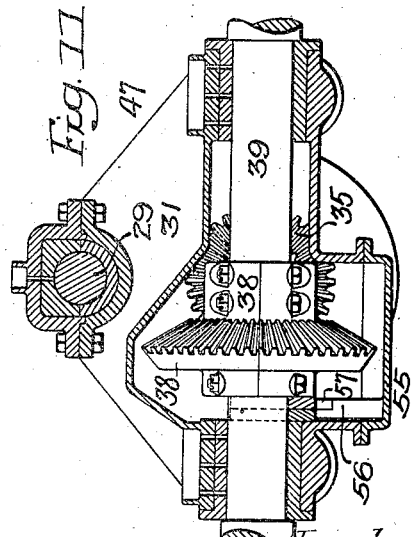
Witnesses
Walter Chrim
Willet Burrowa
Inventors
Samuel M. Vauclain
Morris Linton.
George R. Henderson.
by their Attorneys
Howan Howen

UNITED STATES PATENT OFFICE.

SAMUEL M. VAUCLAIN, OF PHILADELPHIA, PENNSYLVANIA, MORRIS LINTON, OF MOORESTOWN, NEW JERSEY, AND GEORGE R. HENDERSON, OF PHILADELPHIA, PENNSYLVANIA, ASSIGNORS TO THE BALDWIN LOCOMOTIVE WORKS, OF PHILADELPHIA, PENNSYLVANIA, A CORPORATION OF PENNSYLVANIA.

GEARED LOCOMOTIVE.

1,077,769.   Specification of Letters Patent.   Patented Nov. 4, 1913.

Application filed February 4, 1913. Serial No. 746,138.

*To all whom it may concern:*

Be it known that we, SAMUEL M. VAUCLAIN, MORRIS LINTON, and GEORGE R. HENDERSON, citizens of the United States, and residents of Philadelphia, county of Philadelphia, State of Pennsylvania; Moorestown, county of Burlington, State of New Jersey, and Philadelphia, county of Philadelphia, State of Pennsylvania, respectively, have invented certain Improvements in Geared Locomotives, of which the following is a specification.

One object of our invention is to construct a geared locomotive on the general principles of an ordinary locomotive, as far as the steam engine is concerned, and to provide a connection to each pair of wheels and axles such that all will be operated by gearing of the "rolling contact" type between the teeth of the gears in mesh.

A further object of the invention is to construct a locomotive to be driven by gears running in oil, insuring maximum service and minimum wear and repair.

A still further object of the invention is to construct the locomotive so that the gearing can be disconnected to enable the locomotive to be shipped on its own wheels and to provide means for readily assembling the gearing, as fully described hereinafter.

In the accompanying drawings:—Figure 1 is a side view of our improved locomotive; Fig. 2 is a diagram view illustrating the arrangement of the shafts and gearing; Fig. 3 is a sectional plan view illustrating the transverse crank shaft geared to the longitudinal shafts; Fig. 4 is a sectional view on the line $a$—$a$, Fig. 3; Fig. 5 is a sectional view on the line $b$—$b$, Fig. 3; Figs. 6 and 7 are perspective views of the boxes for said longitudinal shafts; Fig. 8 is a plan view of one of the trucks supporting the locomotive; Fig. 9 is a sectional plan view of the same truck on the line $c$—$c$, Fig. 10; Fig. 10 is a sectional view on the line $d$—$d$, Fig. 8; Fig. 11 is a sectional view on the line $e$—$e$, Fig. 8; showing the gears meshing with one another; Fig. 12 is a view showing the gear wheel on the axle out of mesh with the gear wheel on the driving shaft; Fig. 13 is a sectional view on the line $f$—$f$, Fig. 9; Fig. 14 is a perspective view of the cap plate and spacing block, which is adapted to the gearing illustrated in Figs. 11 and 12; Fig. 15 is a detached side view of one of the side frames of the locomotive; and Fig. 16 is a perspective view of one of the waste sheets.

Referring to the drawings, 1 is the side frame of the locomotive.

2 is the boiler.

3—3 are the trucks which are pivotally mounted under the frame and support the entire structure. The details of these trucks may be made in any suitable manner, but the driving mechanism will be described hereinafter.

Mounted in bearings in the side frames 1 is a transverse crank shaft 4, having a crank 5 at each end connected by a rod 6 to the cross head 7.

8 is the steam cylinder in which is a piston and the rod of the piston is connected to the cross head. The valve mechanism is of any suitable type.

In the present instance, we have shown a crank 9 on the main crank 5 of the shaft 4, which is connected to link mechanism 10 leading to the valve in the valve chest 11. The side frames are each made in the form of a truss, Fig. 15, having an upper member 57 and a lower member 58. A cap plate 61 forms a continuation of the lower member at the opening for the box for the transverse shaft, the deepest portion of the truss being at this point. The frame also supports the cylinder casting 8 and is extended forward, as at 59, to support the bumper and at the rear to carry the rear portion of the locomotive. The bearings 12 for the crank shaft 4 form part of a casing 13 and extend through the side frames 1—1, as illustrated in Fig. 3, so that the ends of the crank shaft are properly supported. Within the casing and secured to the shaft 4 is a beveled gear wheel 14, which meshes with wheels 15 and 16 on shafts 17 and 18 respectively, adapted to bearings mounted in lateral extensions 19 of the casing 13. In the bearings 12—12 are the ordinary flanged bushings 20, but in the extensions 19 are special bearings 21, 22, and 23, illustrated in Figs. 6 and 7. The bearing 21 is made in halves Fig. 7, and has a narrow flange. The other bearing is also made in halves 22 and 23, having flanges 24 and 25 respectively, which, when in position, are located between the casing and the rear of the beveled wheel on the shaft. By this construction the shafts and their beveled wheels can be assembled without difficulty, one at a time. The main shaft 4 is first placed in position with its beveled wheel 14 rigidly attached thereto. Then the two shafts 17 and 18 with one half of their bearings 21, in position, are located in the extensions 19. The bearings 22 and 23 are not put in position until after the shafts 17 and 18, with their gears, are in place, and in line with the transverse shaft; the gears being out of mesh. Then, by moving the two shafts 17 and 18 longitudinally until their gears mesh with the gear 14, the lower bearing 22 at each side is placed in position by turning it around the shaft so that its flange 24 will rest between the casing and the back of the gear, holding the beveled gear in mesh with the driving beveled gear 14. The other half of the box is then placed in position and the cap 26 is secured thereto. This insures the absolute mesh of the gears and at the same time allows for the quick assembling of the parts. The casing 13 incloses the gears and forms a receptacle for oil which is closed by a cap 62, Fig. 4, so that the gears run in oil at all times.

The shaft 18 is coupled to a connecting shaft 27 through a universal coupling 28 and this shaft is coupled, in turn, to a shaft 29 through a universal coupling 30. The construction of these couplings is shown in detail in Fig. 10, but other types of couplings may be used without departing from the spirit of the invention. The particular coupling illustrated is set forth and claimed in an application for patent filed by Morris Linton, January 2, 1913, Serial No. 739,748.

The shaft 29 is adapted to bearings 31 on the frame 32 of the rear truck 3 and has a gear wheel 33 secured thereto, which meshes with a gear wheel 34, in the present instance, keyed to the hub of a beveled gear wheel 35 secured to a longitudinal shaft 36 adapted to bearings 37 in the frame 32. The beveled pinion 35 meshes with a beveled gear wheel 38 mounted on the squared portion of the axle 39 on which are the wheels 40. The ends of the axles are adapted to boxes 41 of the truck 3. The gear wheel 38 has an extended hub and is made in two parts bolted together, as clearly illustrated in Fig. 11. On the opposite end of the longitudinal shaft 36 from the bevel pinion 35 is another bevel pinion 43 which meshes with the bevel gear wheel 44, similar to the gear wheel 38, having an extended hub made in two parts and mounted on the squared portion of the axle 45 which is adapted to the bearing in the frame 32 similar to the axle 39. Mounted on this axle 45 are the wheels 46.

It will be noticed that the shaft 36 and the two axles 39 and 45 are all on the same horizontal plane and ordinary bevel gears of the "rolling contact" type are used. The gearing frame 32 is made in two parts 47 and 48 and these two parts are free to turn independently so that the wheels will accommodate themselves to the track. On the part 47 is a cylindrical extension 49 which surrounds the shaft 36 and which projects into a cylindrical section 50 secured to the part 48 of the frame. The two parts of the frame are held against longitudinal movement by the tie rods 51 located on each side of the frame, as shown in Figs. 8, 9, and 13, but the two parts 47 and 48 are free to turn independently to a limited extent.

It will be understood that a locomotive of this type is particularly adapted for logging and other rough roadways and, consequently, a certain flexibility is necessary. The tie rods 51 pass through openings 52 in the sections 47 and 48 of the frame and vertical pins 53 pass through openings in the ends of these tie rods. The extended bearings 54 for the pins are rounded at the ends so as to give the rods freedom of motion except in a longitudinal direction. The two parts 47 and 48 are so made as to inclose the gearing forming chambers for oil so that each pair of gears runs in oil, as well as the gear wheels 33 and 34.

In order to hold the gear wheels 38 and 44 into and out of mesh with their driving pinions, we use the device illustrated in Fig. 14. This device forms part of a cap 55 of the oil chambers and is secured to the under side of each of the frames directly under the shafts 39 and 45 respectively. This cap is made reversible so that it can be shifted from the position illustrated in Fig. 11 to that illustrated in Fig. 12.

56 is a vertical projection on the cap recessed at the upper end so that it will extend on each side of the axle and on the face of this extension is a wear plate 57 bolted, or otherwise secured to it, as illustrated in Fig. 14. When the cap is secured in the position illustrated in Fig. 11, the extension 56 rests between the hub at the rear of the gear wheel 38, and the bearing, holding the gear wheel in mesh with its driving pinion 35. This is the position of the parts when the locomotive is driven under its own steam, but when it is necessary to transfer the locomotive, instead of mounting it on a car or upon special trucks, the cap 55 is detached. The gear wheel is moved longitudinally on its axle and out of mesh with the driving pinion 35, then the cap 55 is turned so that the projection 56 rests in front of the gear wheel 38, as illustrated in Fig. 12, preventing the gears engaging while in transit. The same adjustment is made on the other axles of the engine so that all the axles are free to turn without turning the driving mechanism and the locomotive can be transferred on its own wheels, the same as an ordinary car.

The forward truck of the locomotive is constructed in the same manner as the rear truck and the gearing of this forward truck is a duplicate of the gearing on the rear truck, the forward truck being connected by universal joints to the shaft 17 in the same manner as the mechanism on the rear truck is connected to the shaft 18.

It will be seen by the above construction that the traction mechanism is flexible so that it can accommodate itself to any unevenness of the track. The driving gears are of the ordinary bevel and spur gear type, having "rolling contact." The parts are not complicated and repairs can be readily made, when necessary. The parts can be quickly and correctly assembled and when it is desired to transfer the locomotive on its own trucks, the driving mechanism can be readily thrown out of gear with the axles, as fully described above.

In order to properly brace the structure between the cab and the cylinders, we provide waist sheets 60, as shown in Fig. 16 at the points indicated in Fig. 1, which are secured to the boiler and to the side frames 1.

It will be understood that while we have illustrated our improvements in connection with a locomotive having two pivoted trucks in which the axles are geared to the driving mechanism, that the locomotive may have more than two trucks, if necessary, according to the power of the locomotive and the length of the frame.

We claim:

1. The combination in a geared locomotive, of a frame; trucks mounted under the frame; each truck having two axles; a beveled gear wheel on each axle; a longitudinal shaft; pinions on the shaft meshing with the said beveled gear wheels; a spur gear wheel on said shaft; a short driving shaft; a spur wheel on said shaft and meshing with the first mentioned spur wheel; a bearing frame in which the axles and shafts are mounted; a transverse crank shaft having cranks at each end; a beveled wheel secured to the crank shaft; short longitudinal shafts; a beveled wheel on each shaft meshing with the beveled wheel on the transverse driving shaft; the said shafts being adapted to bearings on the frame of the locomotive; connecting shafts and universal joints between the connecting shafts and the shafts on the main frame and on the truck frames; and cylinders on each side of the locomotive having pistons connected to the cranks of the crank shaft.

2. The combination of the main frame of a locomotive; a central transverse casing mounted in the frame; bearings in the casing; a transverse driving shaft mounted in said bearings and having a crank at each end and also having a beveled wheel thereon; two longitudinal shafts; bearings for the said shafts in extensions of the casing; a beveled wheel on each shaft meshing with the beveled wheel on the main crank shaft; two trucks; axles mounted in bearings on the trucks; gearing on each truck through which the axles are driven; and connections between the longitudinal shafts, which are geared to the transverse driving shaft, and to said gearing on the trucks.

3. The combination in a locomotive, of a main frame; a transverse casing adapted to the main frame and having extensions; bearings in the casing; a main crank shaft arranged transversely and mounted in the said bearings; two driven shafts mounted in the extensions of the casing; a beveled wheel secured to the crank shaft; and beveled wheels secured to the other longitudinal shafts; trucks and gearing thereon connected to the said longitudinal shafts; with bearings for the said longitudinal shafts having flanges which are adapted to rest between the rear of the beveled wheels and the extensions of the casing; said bearings being made in halves so that they can be inserted after the gearing is in position.

4. The combination of a casing; a shaft mounted in bearings in the casing; a beveled gear wheel on the shaft; a shaft arranged at an angle to the first mentioned shaft and having a gear wheel on the end thereof arranged to mesh with the gear wheel on the first mentioned shaft; with a two-part bearing for the last mentioned shaft; said bearing having a flange arranged to rest between the rear of the bevel wheel and the casing; the parts being so designed that this gear wheel, and its shaft, can be placed in position in alinement with the other shaft prior to the insertion of the bearing.

5. The combination of a casing having a bearing; a shaft mounted in the bearing and having a beveled gear wheel thereon; two shafts; each having a beveled gear wheel arranged to mesh with the wheel on the first shaft; extensions on the casing; a two-part bearing through which the shafts extend; said bearing being mounted in the extension of the casing; and a two-part flanged bearing; the lower part of the said bearing having a flange arranged to extend between the back of its gear wheel and the casing so that the two shafts, with their gear wheels, can be placed in position and alined with the gear wheel on the first mentioned shaft and moved into mesh prior to the insertion of the two-part flanged bearings.

6. The combination in a geared locomotive, of a main frame; a main driving shaft on said frame; a truck mounted under the frame; axles adapted to boxes in the trucks;

a two-part frame; one part being mounted on one axle and the other part being mounted on the other axle; means connecting the two-parts; a driven shaft on the truck; a gear wheel on the driven shaft; a longitudinal shaft having beveled pinions at each end; a gear wheel on said shaft meshing with the gear wheel on the driven shaft; and a gear wheel on each axle meshing with the pinions on the longitudinal shaft; the longitudinal shaft and the axles being on the same line.

7. The combination in a geared locomotive, of a main frame; a main driving shaft mounted on the main frame; a truck pivoted to the main frame; a driven shaft flexibly connected to the driving mechanism on the main frame; a two-part gear frame, one part mounted on one axle and the other part mounted on the other axle; a swivel connection between the two frames; a gear wheel on the driven shaft; a longitudinal shaft having a gear wheel meshing with the first mentioned gear wheel; said longitudinal shaft being on the same plane as the axles and having a pinion at each end; a beveled gear wheel on each axle meshing with a pinion on the longitudinal shaft; and means on the casing for holding the said gear wheels into and out of mesh with its pinion.

8. The combination of an axle having a squared portion; a two-part gear wheel arranged to slide on said portion of the axle; a casing inclosing the gear wheel; a driving shaft having a gear wheel meshing with the gear wheel on the axle; and a device arranged to be located between the casing and either end of the gear wheel on the axle to hold the said gear wheel in or out of mesh with the gear wheel on the driving shaft.

9. The combination of an axle, a beveled gear wheel on the axle; a shaft having a beveled pinion meshing with the beveled gear wheel; said beveled gear wheel being adjustable longitudinally on the shaft so that it can be moved into and out of mesh with the pinion; and a forked extension having a wearing face adapted to be inserted either in front of or in back of the gear wheel so as to retain it in mesh or out of mesh with the pinion.

10. The combination of an axle; a gear wheel mounted thereon; a shaft; a pinion on the shaft meshing with the beveled gear wheel; a casing adapted to the shaft and to the axle; a cap having an extension; said extension projecting between the casing and the beveled gear wheel; the parts being so arranged that the cap can be turned so as to bring the projection either in front of the gear wheel to hold it out of mesh with its pinion, or back of the gear wheel to hold it in mesh with its pinion.

11. The combination in a geared locomotive, of a main frame; a driving shaft mounted on the main frame; a truck pivoted under the frame; axles on the truck; a beveled gear wheel on each axle; a two-part gear frame mounted on the axles of the truck; a projection on one part mounted in a projection on the other part; a longitudinal shaft mounted in each part and extending through the projections; a beveled pinion on each end of each shaft; a gear wheel on the shaft; and a longitudinally arranged driven shaft mounted above the first mentioned shaft and geared to the driving mechanism of the locomotive.

12. The combination in a geared locomotive, of a main frame; a driving shaft mounted on the main frame; a truck pivoted under the frame; axles on the truck; a beveled gear wheel on each axle; a two-part gear frame mounted on the axles of the truck; a projection on one part mounted in a projection on the other part; a longitudinal shaft mounted in each part and extending through the projections; a beveled pinion on each end of each shaft; a gear wheel on the shaft; a longitudinally arranged driven shaft mounted above the first mentioned shaft and geared to the driving mechanism on the frame of the locomotive, and two links connecting the two parts of the gear frame.

13. The combination in a geared locomotive, of a main frame; driving mechanism thereon; a truck pivotally mounted under the main frame; axles adapted to boxes on the frame of the truck; a two-part gear frame mounted on the axles; gearing supported by the two-part frame; one part having a projection adapted to a projection on the other part; two links connecting the two parts of the frame; one link being on one side and the other link being on the opposite side of the swivel connection; each link having an eye at each end; and vertical pins on the frame extending through the eyes; the projections on the frame having rounded ends for holding the link in position, but allowing them a certain amount of movement to accommodate themselves to the swivel movement of the two parts of the frame.

14. The combination of a casing inclosing a nest of gears; a driving shaft extending through the casing and having a beveled gear wheel thereon; two driven shafts extending into the casing and each having a beveled gear wheel meshing with the gear wheel on the driving shaft; two bearings for each of said driven shafts; said bearings being made in two parts; one of said bearings having a flange located between the casing and the gear wheel to retain the said gear wheel in mesh with the gear wheel on the driving shaft.

15. The combination in a geared locomotive, of a frame; trucks; a transverse driving shaft; and longitudinal shafts; gears on said shafts; and a casing forming the bearings for the said shafts and inclosing the gears and forming an oil chamber; said casing being mounted in the frame of the locomotive.

16. The combination in a geared locomotive, of two side frames having pedestals; a gear frame extending between the pedestals and having bearings; a transverse driving shaft; and two centrally located driven shafts mounted in said bearings; bevel gears on said shaft; said casing inclosing said gears and forming an oil chamber.

17. The combination in a geared locomotive, of a truck having a frame made in two parts and connected so that one part is free to turn independently of the other part; an axle mounted in each part of the frame; a longitudinal shaft having its bearings in each part of the frame; bevel gear wheels on the axles and bevel pinions on the shaft meshing with the gear wheels; means for driving the shaft; said frame inclosing the gear wheel and forming two oil chambers.

18. The combination in a geared locomotive, of a main frame consisting of two side frames; a boiler supported thereon; a transverse waste sheet extending from one side frame to the other and to the boiler; two trucks pivotally mounted under the frame; axles on the trucks; gearing on each truck by which the axles are driven; a central crank shaft flexibly geared to the gearing on the trucks; and cylinders secured to the main frames of the locomotive; each cylinder having a piston connected to the cranks of the crank shaft.

In testimony whereof, we have signed our names to this specification, in the presence of two subscribing witnesses.

SAMUEL M. VAUCLAIN.
MORRIS LINTON.
GEORGE R. HENDERSON.

Witnesses:
CARLETON LINSLEY,
EDGAR G. THOMAS.